May 27, 1958 W. B. ZERN 2,836,209
SAW WITH GAUGE SUPPORT
Filed May 9, 1955 2 Sheets-Sheet 1
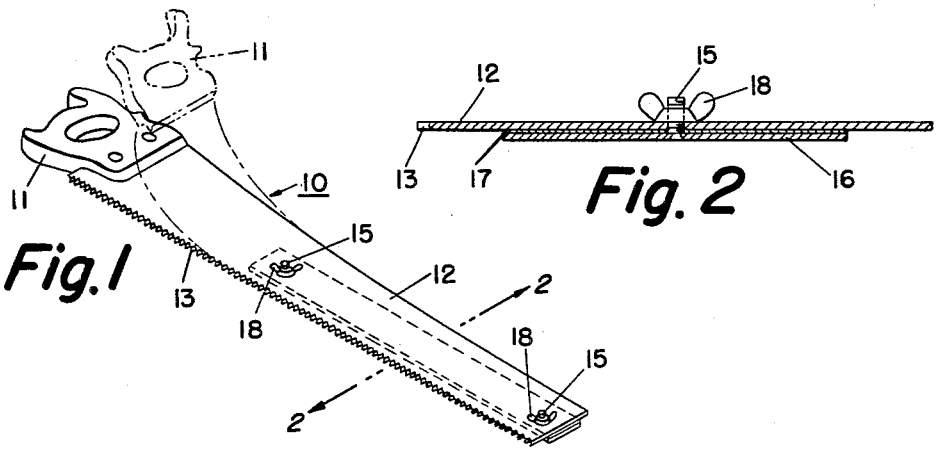
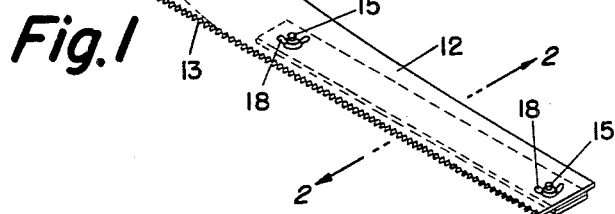
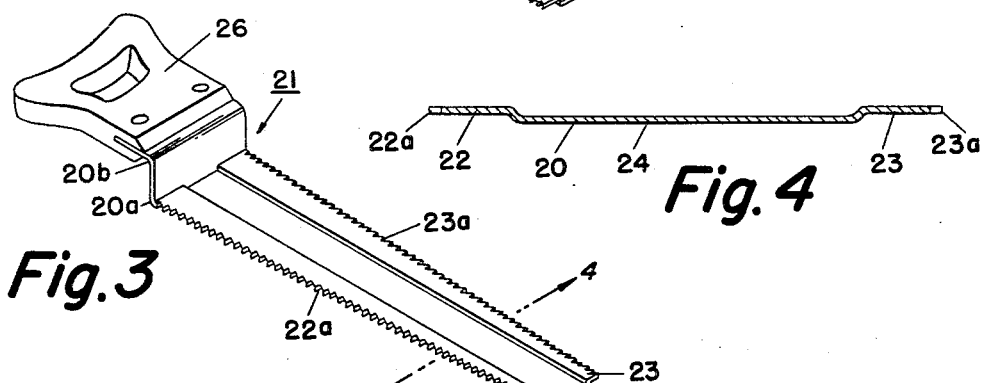
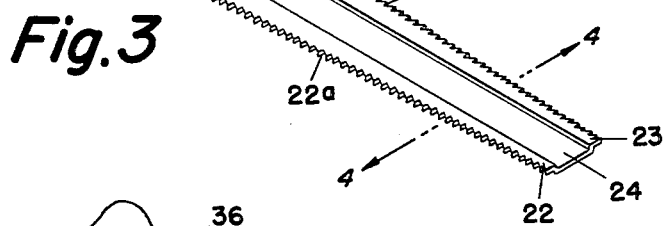
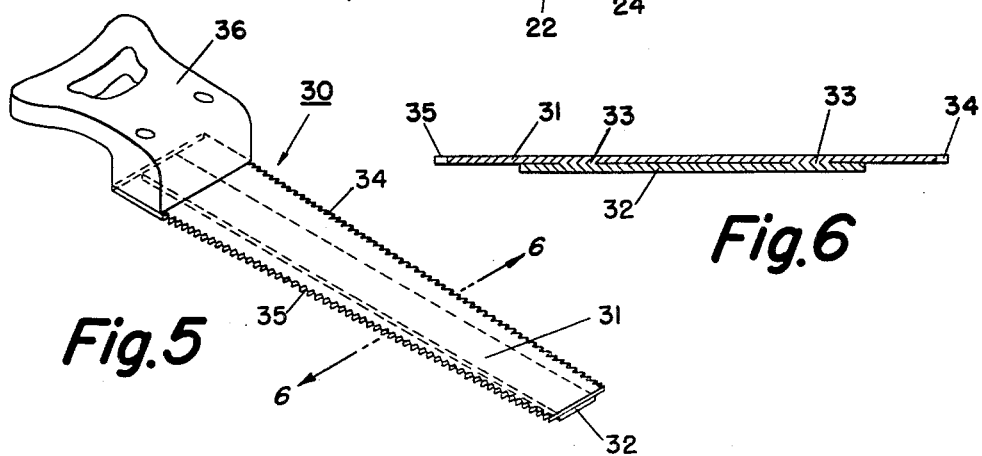
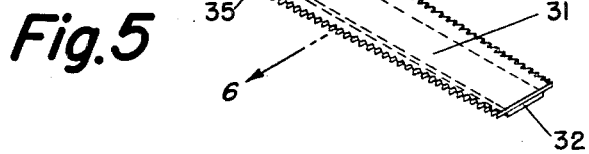

May 27, 1958   W. B. ZERN   2,836,209
SAW WITH GAUGE SUPPORT
Filed May 9, 1955   2 Sheets-Sheet 2
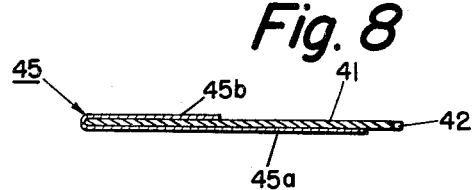
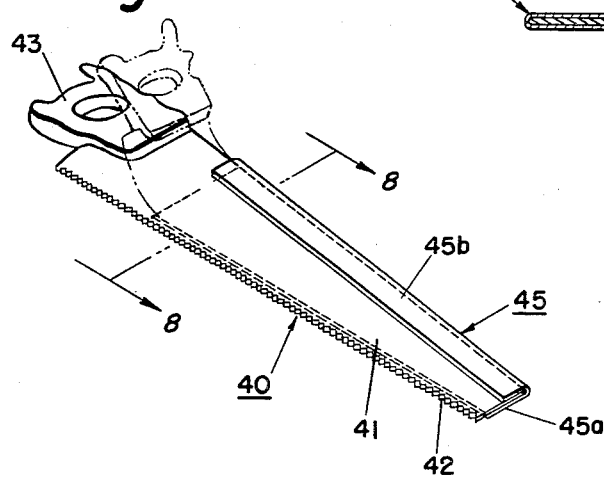
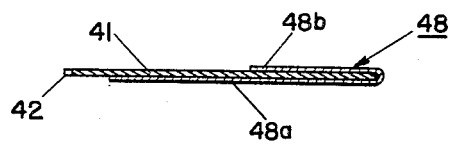
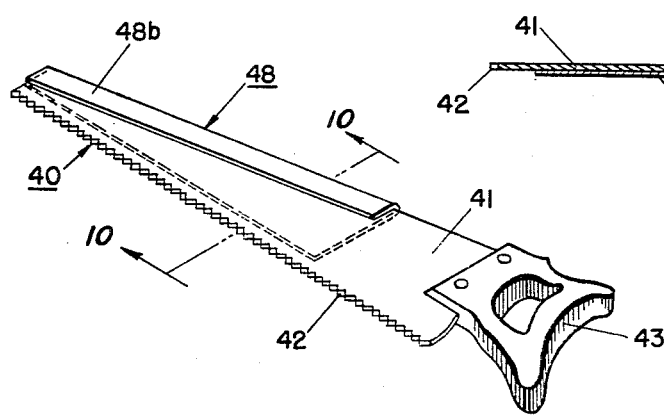

United States Patent Office 2,836,209
Patented May 27, 1958

2,836,209
SAW WITH GAUGE SUPPORT
Warren B. Zern, near Pottstown, Pa.
Application May 9, 1955, Serial No. 506,693
15 Claims. (Cl. 145—35)

This invention relates to a saw with a novel gauge support or shield and more particularly to a hand saw suited for trimming the end of a work member while the latter is supported against a flat surface without scratching or marring said surface.

There frequently arises the need for trimming the end of a work member while in a supported position such, for example, as the end of a table leg while supported in its normal position on the floor. During such trimming operation it is desirable that only a predetermined amount be cut from the end of the table leg in order that when the leg is trimmed, all of the table legs will stand firmly on the floor. This operation can be more accurately accomplished if the table leg can be trimmed while the table is in its normal positon, as in that way it can be more readily determined how much material should be cut from the end of the table leg. It is practically impossible to perform this operation with a conventional hand saw, as it is difficult to guide the cutting blade in the proper plane during the cutting operation as only a small amount is generally required to be removed from the table leg and, as a result, the teeth of the saw engage the floor and scratch or otherwise damage the latter.

In accordance with the present invention there is provided a saw comprising blade structure having teeth extending along one edge thereof forming a cutting edge, and gauge means on one side of the blade structure and spaced from the teeth to avoid interfering with the cutting operation of the teeth, the gauge means extending both lengthwise and transversely of the blade structure to define an outermost plane at said one side having an area width sufficiently great to engage a substantially flat surface and support the cutting edge for reciprocation in a plane parallel to the surface and to one side thereof a distance determined by the thickness of the gauge means.

More particularly in accordance with the present invention there is provided a hand saw suited for trimming the end of a work member supported against a flat surface such as the end of a table leg while supported in its normal positon on a floor, comprising blade structure having a cutting section with a cutting edge extending longitudinally thereof, a gauge section movable with the cutting section, the gauge section having a smooth outer surface for supporting the cutting section for operation in a plane parallel to and above the flat surface a distance controlled by the thickness of the gauge section in avoidance of scratching the flat surface and without disturbing the normal position of the work member, and a handle connected to the blade structure.

In one form of the invention it is contemplated that the gauge section is removably secured to the cutting section by threaded means.

In another form of the invention it is contemplated that the gauge section comprises a shallow channel portion of the blade structure.

In a further form of the invention it is contemplated that the cutting section include a pair of spaced cutting edges extending longitudinally of the blade structure and that the gauge section be disposed intermediate the cutting edges.

For a more detailed disclosure of the invention and for further objects and advantages thereof, reference is to be had to the following description taken in conjunction with the accompanying drawing, in which:

Fig. 1 is a perspective view of one embodiment of the invention with the handle of the saw adapted to be operated to the side of the blade structure opposite the gauge means by bowing the handle end of the blade structure as indicated in phantom;

Fig. 2 is an enlarged sectional view of the blade structure shown in Fig. 1;

Fig. 3 is a modification of the invention;

Fig. 4 is an enlarged sectional view through the blade structure of the modification shown in Fig. 3;

Fig. 5 is another modification of the invention;

Fig. 6 is an enlarged sectional view through the blade structure of the modification shown in Fig. 5;

Fig. 7 is a further modification of the invention;

Fig. 8 is a sectional view through the blade structure shown in Fig. 7;

Fig. 9 is a modification similar to that shown in Fig. 7 but with a removable gauge support of the opposite hand; and Fig. 10 is a sectional view through the blade structure shown in Fig. 9.

Referring to the drawing, there is shown in Fig. 1 a hand saw 10 embodying the present invention. The hand saw 10 is provided with a conventional handle 11 and a conventional blade 12 having teeth 13 extending along one edge thereof. While for most applications it will be preferable that the teeth be designed for cross-cutting operations, it is to be understood that the invention is not limited thereto, and the teeth may be designed for ripping or other types of cutting operations. The blade 12 is provided with a pair of spaced apertures extending therethrough and adapted to receive a pair of stud members 15 to which is secured a gauge plate 16 forming the gauge section of the novel blade structure. The studs 15 are secured at one end thereof to the gauge plate 16 in any suitable manner such as by brazing or the like, and the lower surface of plate 16 as shown in Fig. 2 is maintained smooth so that it will not mar the floor or other surface that it is adapted to engage. The upper ends of the studs 15, preferably threaded, are adapted to extend through the openings in blade 12 and to hold the gauge plate 16 securely to blade 12 by means of cooperating members illustrated as wing nuts 18. The gauge plate 16 will support the cutting section 12 of the blade structure above the floor or other surface a distance determined by the thickness of the gauge section 16. If it is desired that the cut be made at a greater distance above the lower surface of gauge plate 16, a thicker gauge plate 16 may be provided or, as shown in Fig. 2, an additional spacer or shim member 17 may be utilized between the blade 12 and the gauge plate 16.

The thickness of the gauge section of the blade structure will vary from a few thousandths of an inch up to an eighth of an inch or so, depending upon the amount of material desired to be cut from the end of the work piece. As the amount of material to be removed is small, such material will be removed in the form of saw dust during the cutting operation and thus the gauge portion of the blade structure will not interfere with the cutting operation. When it is desired to trim large amounts of stock from the end of the work piece, no damage is encountered in scarring an adjacent supporting surface, and thus it is not necessary to employ the present invention.

By removably securing the gauge section to the blade structure as shown in Figs. 1 and 2, the saw 10 may be used for either right-hand or left-hand operations by merely transferring the gauge plate 16 from one side of blade 12 to the other. The removable gauge section has another advantage in that it may be used to readily adapt a conventional hand saw for the aforesaid cutting operations by merely providing the blade 12 with the appropriate openings to receive the studs 15 projecting from the gauge plate 16. Thus a conventional saw may be readily provided with the novel gauge support in accordance with the present invention where it is necessary to trim the work piece while in supported position and without marring or scratching adjacent surfaces.

To operate the saw illustrated in Figs. 1 and 2, the gauge support 16 is placed against the work supporting surface, such as the floor, and the teeth 13 in the area directly opposite the gauge 16 are brought into contact with the end of the work piece to be trimmed, such as the end of the table leg. As the end of the blade 12 adjacent the handle 11 is flexible, the blade 12 may be bowed as illustrated in Fig. 1, and the handle 11 moved to the side of the blade structure opposite the gauge means 16 during the cutting operation and thus the handle 11 will not engage the floor. Accordingly, the gauge means 16 will be the only portion of the saw engaging the floor during the cutting operation and as its engaging surface is smooth, it will serve as a shield and prevent the floor from being scratched or otherwise damaged during the cutting operation.

Referring to Figs. 3 and 4, there is shown a modification of the invention where the blade structure 20 of saw 21 is provided with spaced cutting sections 22 and 23 extending lengthwise of the blade and separated by a central gauge section 24 in the form of a channel. The channel section 24 has a predetermined depth corresponding to the thickness of the gauge means 16 shown in Fig. 2 and is adapted to support the cutting sections 22 and 23 in a plane thereabove. The cutting sections 22 and 23 are each provided with a row of teeth 22a and 23a respectively so that the saw 21 may be used for either right-hand or left-hand cutting operations. The gauge section 24 will also act as a shield and prevent the cutting sections 22 and 23 from scratching or scarring the floor in a manner similar to that described above in connection with the embodiment illustrated in Figs. 1 and 2. As shown in Fig. 3, a handle 26 is secured to one end of the blade 20 and blade 29 is bent at approximately right angles at locations 20a and 20b to provide an offset in blade 20 whereby handle 26 may be operated to the side of the blade structure opposite the gauge means 24 and thus will not engage the floor during a cutting or trimming operation.

A further modification is illustrated in Figs. 5 and 6 where the blade structure of saw 30 comprises a cutting blade 31 having a gauge plate 32 permanently secured thereto in any suitable manner as by spot welding or brazing as indicated at 33. The blade member 31 has rows of teeth 34 and 35 at the opposite edges thereof extending lengthwise of the blade. The gauge and supporting member 32 has been illustrated as extending the full length of the blade structure and thus is adapted to support both the cutting blade 31 and the handle 36 out of contact with the floor or other similar surface supporting and adjacent to the work piece being trimmed. The handle 36 is attached to the blade structure at the side thereof opposite the gauge plate 32.

Referring to Figs. 7 and 8, there is shown a further modification of the invention wherein the hand saw 40 includes a cutting blade 41 having a row of teeth 42 along one edge and a handle 43 at one end of the blade. Removably secured to the blade 41 is a gauge support means 45 extending lengthwise of the blade and folded tightly over the non-cutting edge to grip the blade 41 by friction. The gauge support 45 may be formed from any suitable material such, for example, as from a sheet of stainless steel of predetermined thickness. The thickness of the sheet material will determine the height that the saw blade will be supported above the adjacent surface during a cutting operation. In one application it was found that stainless steel having a thickness in the order of .015 inch to .020 inch worked very well both from the standpoint of tightly gripping the saw blade and from the standpoint of supporting the blade at a height sufficient to prevent the teeth from scratching the adjacent surface. As mas be seen in Figs. 7 and 8, the lower plate section 45a of means 45 performs the gauging and supporting functions and cooperates with the upper plate section 45b to grip the blade 41 therebetween. Section 45b is relatively narrow in order not to interfere with the work during the cutting operation whereas section 45a corresponds more closely to the width of the blade 41 in order to provide adequate support for the teeth 42 during the cutting operation. The free edge of section 45a is substantially parallel to the cutting edge of the blade 41 and the free edge of section 45b is substantially parallel to the back or non-cutting edge of blade 41.

As the gauge support means 45 is held on to blade 41 by friction and is readily removable therefrom, the saw 40 may be of any conventional type such as the ordinary cross-cut or rip saws, and no alteration of the blade is necessary in order to attach the gauge support 45 thereto. During the cutting operation the handle end of the blade 41 may be bowed as illustrated in phantom in Fig. 7 in manner similar to that previously described in connection with Fig. 1.

In Figs. 9 and 10 the saw 40 has been turned over from its position shown in Fig. 7 in order to perform an opposite hand cutting operation. The removable gauge support means 48 is also of the opposite hand from means 45 and comprises a wide lower supported plate section 48a and a narrow upper section 48b. Accordingly, a carpenter may perform cutting or trimming operations either to his right or to his left merely by interchanging the gauge support means 45 and 48 and without changing his position with respect to the work.

The supporting plates 45a and 48a extend sufficiently close to the teeth 42 to provide the required support but not too close to prevent the teeth from being sharpened when necessary. Sometimes the teeth become spread during sharpening, and in order to insure that they do not extend below the supporting plate, it is preferable to stone the side of the teeth adjacent the supporting plate.

It will be understood that the height that the saw blade 41 will be supported above the adjacent surface during a cutting operation may be changed either by forming shields 45 and 48 from various thicknesses of stock or by inserting suitable shim means between blade 41 and plate section 45a or 48a in manner similar to shim 17 illustrated in Fig. 2.

In the modifications illustrated in Figs. 3 and 5, as the handles 26 and 36 respectively are normally in a position to one side of the blade structure, it is not necessary to flex the blade structure to a bowed position as described in connection with the embodiments illustrated in Figs. 1, 7 and 9. Thus in each of the illustrations of the invention the gauge section is adapted to be reciprocated in a plane and to support the cutting section of the blade structure for reciprocation in a parallel plane spaced to one side thereof.

While the present invention has been described in connection with trimming the leg of a table while supported on the floor, it is to be understood that the novel saw has many other applications that are equally advantageous. For example, the saw may be utilized for trimming the end of a door jamb after it has been mounted in the frame of a doorway. Also the novel saw may be used for trimming the end of a door to size. For example, sometimes a floor is not even and when a door is opened, it will engage the uneven section of the floor and thus prevent the door from being opened all the way. Under such circumstances it is difficult to tell exactly how much is necessary to trim off of the end of the door in order to allow it to clear the uneven portion of the floor. With a saw constructed in accordance with the present invention, it is not necessary to determine exactly the amount to be trimmed from the end of the door as the trimming operation may be performed in the following manner. The door may be opened until it engages the uneven portion of the floor, at which time the saw of the present invention is utilized to trim the end of the door. The gauging and supporting shield section of the blade structure will engage the surface of the floor and thus prevent or shield the teeth of the cutting section from scratching or otherwise damaging the floor surface. One cut with the saw will normally be sufficient to permit the door to clear the uneven portion of the floor. However, in instances where the unevenness of the floor is magnified, a second trimming operation may be required. Such second trimming operation will take place at the location where the door again binds on the uneven portion of the floor.

The novel saw structure permits the foregoing trimming operations to be performed quickly and accurately without requiring removal of the work from its normally supported position and without danger of damaging the floor or other adjacent surface.

While preferred embodiments of this invention have been illustrated, it is to be understood that other modifications thereof may be made within the scope of the appended claims.

What is claimed is:

1. A hand saw suited for trimming the end of a work member supported against a flat surface such as the end of a table leg while supported in its normal position on a floor comprising blade structure having a cutting section with a cutting edge extending longitudinally thereof, a gauge section movable with said cutting section, said gauge section having a smooth outer surface for supporting said cutting section for operation in a plane parallel to and above the flat surface a distance controlled by the thickness of said gauge section in avoidance of scratching the flat surface and without disturbing the normal position of the work member, and a handle connected to said blade structure.

2. A hand saw according to claim 1 wherein said gauge section comprises a shallow channel portion of said blade structure.

3. A hand saw according to claim 1 wherein said gauge section comprises a flat metal member secured to said cutting section and said handle is secured to said blade structure and extends therefrom at the side opposite said gauge section.

4. A hand saw according to claim 1 wherein said cutting section includes a pair of spaced cutting edges extending longitudinally of said blade structure and said gauge section of said blade structure is disposed intermediate said cutting edges.

5. A hand saw suited for trimming the end of a member supported against a flat surface comprising blade structure having a pair of cutting sections each having a cutting edge extending longitudinally thereof and a channel portion forming a gauge section and connected to the non-cutting edges of said cutting sections, said gauge section having a smooth outer surface for supporting said cutting sections for operation in a plane above the flat surface a distance controlled by the depth of said channel in avoidance of scratching the flat surface and without disturbing the normal position of the member, and a handle connected to said blade structure and projecting to the side of said blade structure opposite said gauge section.

6. A saw comprising blade structure having teeth extending along one edge thereof forming a cutting edge, and gauge means on one side of said blade structure and spaced from said teeth to avoid interfering with the cutting operation of said teeth, said gauge means extending both lengthwise and transversely of said blade structure to define an outermost plane at said one side having an area sufficiently great to engage a substantially flat surface and support said cutting edge for reciprocation in a plane parallel to the surface and to one side thereof a distance determined by the thickness of said gauge means.

7. A hand saw according to claim 6 including means for removably securing said gauge means to either side of said blade structure whereby said gauge means may be moved from one side of said blade structure to the other.

8. A hand saw according to claim 7 wherein said gauge means comprises a plurality of layers whereby the thickness of said gauge means may be varied.

9. A saw comprising blade structure having a plurality of sections extending lengthwise of said blade structure, one of said sections being of substantially uniform thickness and having teeth extending along an outer longitudinal edge thereof to form a cutting section, and a flat gauge section secured to one side of and behind said teeth on said cutting section, said gauge section having a smooth outer surface adapted to engage a flat surface during a cutting operation to support said cutting section in a plane parallel to the plane of the flat surface and spaced therefrom a distance controlled by the thickness of said gauge section in avoidance of scratching the flat surface with said teeth.

10. A hand saw according to claim 9 wherein said blade structure has teeth extending along both outer longitudinal edges thereof to form spaced right-hand and left-hand cutting sections and said gauge section is disposed intermediate said right-hand and left-hand cutting sections.

11. A hand saw comprising a blade having teeth extending along one edge thereof, a handle secured to said blade adjacent one end thereof, and gauge structure comprising plate means carried by said blade on one side thereof and rearwardly of said teeth, said gauge structure having a smooth outer surface adapted to support said blade above a surface during a cutting operation and to control the thickness of material removed during the cutting operation.

12. A hand saw according to claim 11 wherein said plate means has stud means projecting from only one side thereof, said blade is perforated to receive said stud means, and means engaging said stud means for securing said blade and said plate means together to form a layer type structure.

13. A hand saw according to claim 11 wherein said plate means is folded tightly over the edge of said blade opposite said teeth frictionally to grip said blade during a cutting operation.

14. For use with a hand saw having a blade with teeth extending along one edge thereof, the improvement comprising gauge structure including plate means having means for removably securing said gauge structure to one side of the blade and rearwardly of the teeth, said plate means having a smooth outer surface adapted to support the blade relative to a surface during a cutting operation to shield the teeth from marring the last-named surface and to control the thickness of material removed during the cutting operation.

15. The improved gauge structure according to claim 14 wherein said plate means is of channel-shaped construction including upper and lower plate sections joined along one edge thereof to receive the non-cutting edge of the saw blade therebetween, said plate sections being normally biased into engagement with each other in order frictionally to grip the opposite sides of the saw blade in avoidance of relative movement between the blade and said gauge structure during a cutting operation.

References Cited in the file of this patent

UNITED STATES PATENTS 1,164,568    Belsante _____ Dec. 14, 1915

FOREIGN PATENTS 16,239    Great Britain _____ July 14, 1911
18,618    Great Britain _____ Aug. 13, 1914